United States Patent [19]

Mabuchi et al.

[11] Patent Number: 5,449,698
[45] Date of Patent: Sep. 12, 1995

[54] METHOD AND APPARATUS FOR PRODUCING INTEGRAL SKIN POLYURETHANE FOAM

[75] Inventors: Akira Mabuchi; Osamu Yamanaka; Naoyuki Kumagai; Satoru Ono; Motoshi Matsuura, all of Inazawa, Japan

[73] Assignee: Toyoda Gosei Co., Ltd., Inagawa, Japan

[21] Appl. No.: 946,077

[22] Filed: Sep. 18, 1992

[30] Foreign Application Priority Data

Sep. 26, 1991 [JP] Japan .................................. 3-277285

[51] Int. Cl.⁶ ............................................. C08J 9/34
[52] U.S. Cl. ............................................. 521/51; 528/48; 528/49; 528/499; 264/40.5; 264/53; 264/54; 425/812; 425/817 R
[58] Field of Search ........................ 521/51; 526/920; 264/40.5, 53, 54; 425/812, 817 R; 528/48, 49, 499

[56] References Cited

U.S. PATENT DOCUMENTS

| | | |
|---|---|---|
| 3,954,537 | 5/1976 | Alfter et al. . |
| 3,970,732 | 7/1976 | Slaats et al. . |
| 4,206,170 | 6/1980 | Sassaman et al. . |
| 4,285,893 | 8/1981 | Contastin . |
| 4,510,106 | 4/1985 | Hirsch . |
| 4,517,313 | 5/1985 | Nakatani . |
| 4,555,087 | 11/1985 | Wallner et al. . |
| 4,572,865 | 2/1986 | Gluck et al. . |
| 4,576,970 | 3/1986 | Ganster et al. ................. 521/51 |
| 4,579,700 | 4/1986 | Cavender . |
| 4,909,972 | 3/1990 | Britz . |
| 4,916,168 | 4/1990 | Pham et al. . |
| 4,988,271 | 1/1991 | Kumasaka et al. . |
| 5,132,329 | 7/1992 | Lynch et al. ..................... 521/51 |
| 5,166,183 | 11/1992 | Franyutti et al. ................. 521/51 |

FOREIGN PATENT DOCUMENTS

| | | |
|---|---|---|
| 1407244 | 9/1975 | European Pat. Off. . |
| 6381 | 1/1980 | European Pat. Off. . |
| 44226 | 1/1982 | European Pat. Off. . |
| 211495 | 2/1987 | European Pat. Off. . |
| 353061 | 1/1990 | European Pat. Off. . |
| 2196366 | 3/1974 | France . |
| 2634157 | 1/1990 | France . |
| 1813298 | 3/1969 | Germany . |
| 2212609 | 10/1973 | Germany . |
| 2366184 | 6/1979 | Germany . |
| 3310677 | 3/1984 | Germany . |
| 55-63237 | 5/1980 | Japan . |
| 55-63238 | 5/1980 | Japan . |
| 55-63238 | 5/1980 | Japan . |
| 56-111648 | 9/1981 | Japan . |
| 62-164709 | 7/1987 | Japan . |
| 63-268624 | 11/1988 | Japan . |
| 645528 | 1/1989 | Japan . |
| 2092509 | 8/1982 | United Kingdom . |

OTHER PUBLICATIONS

Patent Abstract of Japan, vol. 005, No. 190 (M100) Apr. 1981 re JP-A 56111648.
Patent Abstract of Japan, vol. 008, No. 057 (M283) Mar. 1984, re JP-A 58209535.
Patent Abstract of Japan, vol. 004, No. 105 (M023) Jul. 1980, re JP-A 55063238.
Patent Abstract of Japan, vol. 12, No. 376(M–750)(3223) Oct. 1988.

*Primary Examiner*—John Kight, III
*Assistant Examiner*—Duc Truong
*Attorney, Agent, or Firm*—Cushman, Darby & Cushman

[57] ABSTRACT

Disclosed herein is a process for producing an integral skin polyurethane foam which comprises expanding a reacting mixture containing substantially no blowing agent in an evacuated mold cavity. Disclosed also herein is an apparatus for producing said an integral skin polyurethane foam which comprises a mold having a cavity and a vent hole, a vacuum chamber communicating with the cavity through the vent hole, a vacuum pump to evacuate the cavity through the vacuum chamber, and a sight glass attached to the vacuum chamber so as to make the vicinity of the vent hole visible from the outside of the vacuum chamber.

7 Claims, 15 Drawing Sheets

METHOD AND APPARATUS FOR PRODUCING INTEGRAL SKIN POLYURETHANE FOAM

BACKGROUND OF THE INVENTION

1. Field of the Invention

The present invention relates to a method and apparatus for producing an integral skin polyurethane foam having a non-porous, solid layer on its surface. The method and apparatus are suitable for the production of polyurethane foams by so-called reaction injection molding (RIM hereinafter). Examples of the polyurethane foams include automotive parts such as steering wheels, steering wheel pads, instrument panels, console box lids, glove box lids, headrests, armrests, and air spoilers.

2. Description of the Prior Art

Among polyurethane foams is an integral skin semi-rigid polyurethane foam. It is produced in the following manner from a long-chain polyol having a molecular weight of the order of thousands, a low-molecular polyol having a molecular weight of the order of tens to hundreds, a catalyst, a pigment, a blowing agent (trichlorofluoromethane or freon-11 or simply freon hereinafter), and an isocyanate. All the components except isocyanate are preliminarily mixed to give a polyol mixture. The polyol mixture is mixed with the isocyanate by a mixing head in a prescribed ratio to give a reacting mixture. Finally, the reacting mixture is injected into a mold cavity made of a highly heat-conductive material, so that it expands in the mold cavity.

Upon injection into the mold cavity, the polyol mixture and isocyanate undergo the urethane-forming reaction, which is exothermic enough to vaporize the freon in the reacting mixture into a myriad of bubbles. Thus the reacting mixture slowly expands and flows in the mold cavity, expelling the air from the vent hole of the mold cavity when it has reached the vent hole.

At the center of the reacting mixture, the urethane-forming reaction and the vaporization of freon take place simultaneously, sustaining a myriad of freon bubbles. The consequence of the reaction is the formation of a highly expanded core at the center of the mold cavity. On the other hand, the reacting mixture close to the walls of the mold cavity undergoes the urethane-forming reaction more slowly than that at the center because the reaction heat dissipates through the walls of the mold cavity. The slower the reaction, the less the reaction heat. This suppresses the vaporization of freon and hence generates a less number of freon bubbles. Freon bubbles are compressed or collapsed by the internal foaming pressure. The result is the formation of a non-porous, solid integral skin on the surface of the polyurethane foam. Overpacking of the reacting mixture is a common practice to increase the foaming pressure, thereby facilitating the formation of the integral skin, and to promote the mold filling and air vent.

The above-mentioned conventional method for producing integral skin polyurethane foams by the aid of freon poses the following five problems.

(1) Freon as the blowing agent, once released in the atmosphere, destroys the ozono-sphere to aggravate the healthy living environment. For this reason, its use is limited or banned. This situation necessitates the development of a new method for producing polyurethane foams without freon.

(2) Forming the skin by collapsing freon bubbles in the surface section by the internal foaming pressure

[column 2]

permits minute freon bubbles to remain inevitably in the skin. They impair the appearance.

(3) Over-packing to increase the internal foaming pressure causes a large amount of the reacting mixture to be discharged from the vent. This leads to a great loss of materials.

(4) An effective way of reducing the cycle time and increasing the production efficiency is to increase the reaction rate of the reacting mixture, thereby reducing the cure time. This object is achieved by increasing the amount of the catalyst or raising the temperature of the reacting mixture at the time of injection. The latter is preferable to the former, which leads to an increase in production cost. The latter method, however, is impracticable because the raised temperature causes freon to vaporize before injection. Moreover, the foaming by freon involves a disadvantage that the heat of reaction of the reacting mixture is used as the heat of vaporization of freon. This retards the temperature rise of the reacting mixture and unduly prolongs the cure time.

(5) The conventional foaming by freon suffers from another disadvantage in the case where a core is placed in the mold cavity. That is, the core brings about the turbulence of the reacting mixture, which leads to defects such as pinholes, voids, and short shot due to entrapped air. This trouble is conspicuous in the production of steering wheels, in which case a long ring core is placed in the mold cavity. Thus it is necessary to select an adequate place for gating to minimize turbulence and to form several vents to release entrapped air.

In the meantime, methods of producing polyurethane foams by using reduced pressure are disclosed in the following Japanese Patents. However, they do not necessarily disclose or suggest the object, constitution, and effect of the present invention.

(1) Japanese Patent Laid-open Nos. 63237/1980 and 63238/1980 disclose a method for causing the reacting mixture to uniformly expand to fill the mold cavity completely, by evacuating the mold cavity through thin grooves formed in the walls of the mold cavity. The disclosed invention is intended solely to produce a uniform rigid polyurethane foam free of defects such as voids and blisters. Therefore, it mentions nothing about the blowing agent.

(2) Japanese Patent Laid-open No. 111648/1981 discloses a method of foaming the reacting mixture in an atmosphere of reduced pressure. It claims that this method produces an effect of reducing the amount of the blowing agent (such as freon) required. However, this method employs freon as with the conventional one, and hence it also poses the problem associated with the destruction of the ozono-sphere. Therefore, it is basically different from the present invention which does not resort to freon at all.

(3) Japanese Patent Laid-open No. 164709/1987 discloses a method for producing a low-density polyurethane foam by expanding a reacting mixture (containing water as a blowing agent) in an atmosphere of reduced pressure. Unlike the present invention, this method is not intended to produce an integral skin polyurethane foam. (The formation of a skin is not desirable.) It follows from the fact that water is used as a blowing agent that this method does not teach or suggest the present invention in which no blowing agent is used.

(4) Japanese Patent Laid-open No. 268624/1988 discloses a method of producing a polyurethane foam by causing a reacting mixture to capture nitrogen gas as much as 2-30 vol % in the form of fine bubbles dispersed therein, and expanding the reacting mixture in an atmosphere under reduced pressure. This method is not designed to produce the integral skin polyurethane foam as in the present invention. It follows from the fact that dispersed fine bubbles of nitrogen gas are used as a blowing agent that this method does not teach or suggest the present invention in which no blowing agent is used.

(5) Japanese Patent Publication No. 5528/1989 discloses a method for producing a rigid polyurethane foam by injecting a reacting mixture into a mold cavity evacuated to about 50–500 mmHg at a packing ratio of about 150–450%, and subsequently expanding the reacting mixture while keeping the mold temperature at about 10°–45° C. It follows from the fact that the reacting mixture contains a blowing agent (such as freon) that this method does not teach or suggest the present invention in which no blowing agent is used.

SUMMARY OF THE INVENTION

The present invention was completed to solve the above-mentioned problems. It is an object of the present invention to provide a new method and apparatus for producing an integral skin polyurethane foam efficiently with a minimum of loss of the reacting mixture, without using troublesome freon or any other blowing agent, said integral skin polyurethane foam having a better appearance and feel and better physical properties than those which are produced by using freon.

According to the present invention, the process for producing an integral skin polyurethane foam comprises expanding a reacting mixture containing substantially no blowing agent in an evacuated mold cavity.

According to the present invention, the apparatus for producing an integral skin polyurethane foam comprises a mold having a cavity and a vent, a vacuum chamber communicating with the cavity through the vent, a vacuum pump to evacuate the cavity through the vacuum chamber, and a sight glass attached to the vacuum chamber so as to make the vicinity of the vent visible from the outside of the vacuum chamber.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

Figure 1:
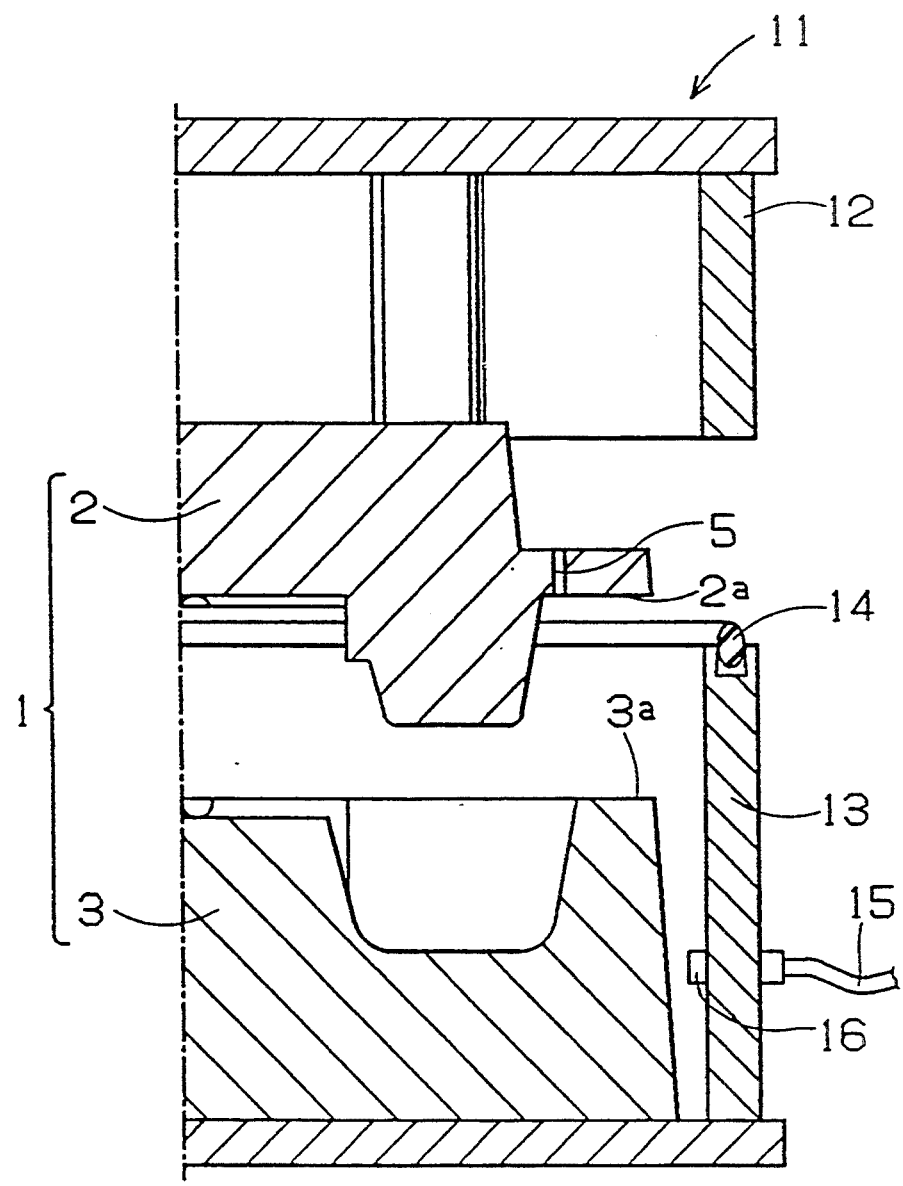
FIG. 1 is a half sectional view showing the vacuum chamber and mold (in the open position) used in the first example of the present invention.
Figure 2:
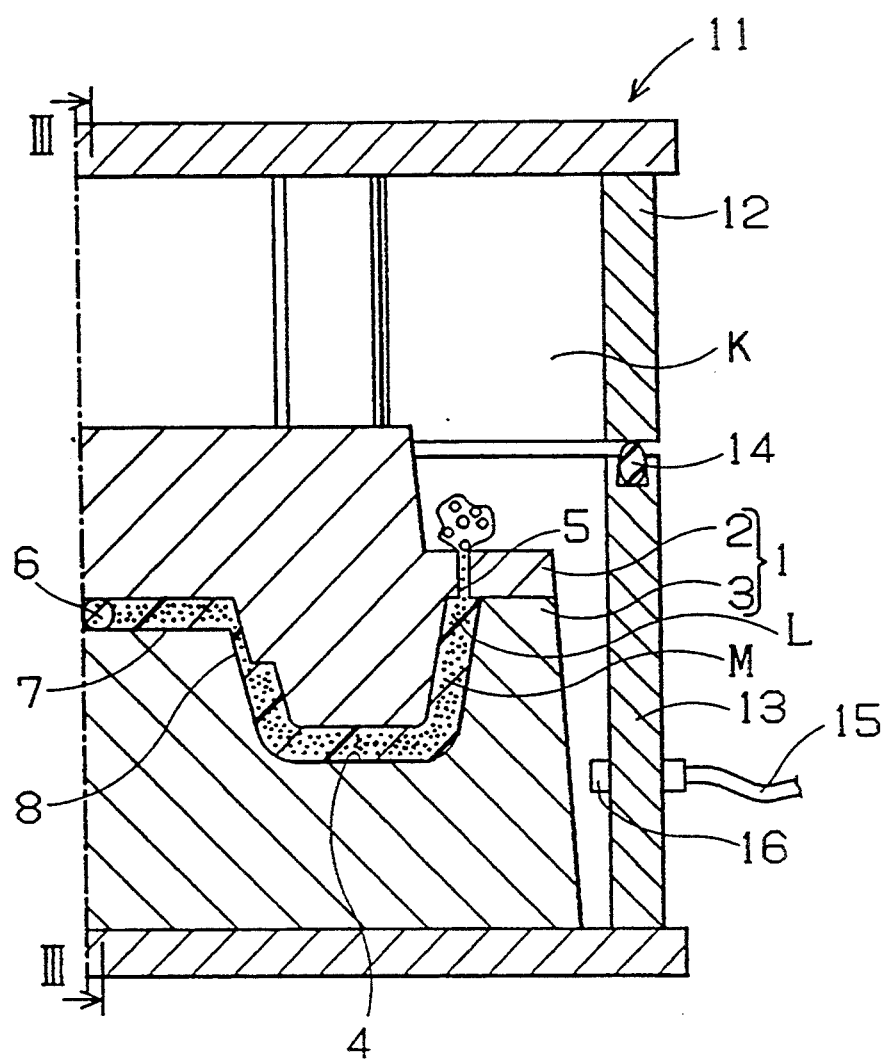
FIG. 2 is a half sectional view showing RIM operation under way, with the mold closed, in the apparatus as shown in FIG. 1.
Figure 3:
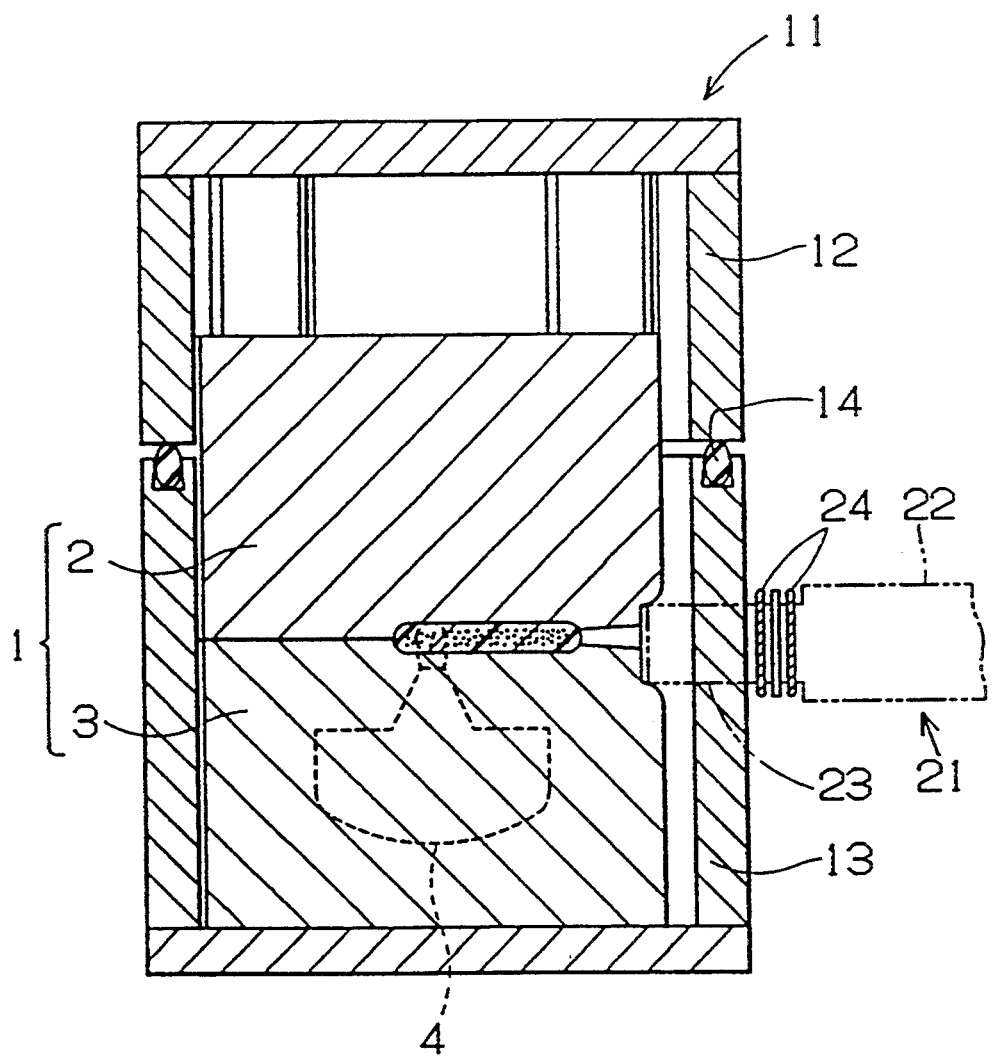
FIG. 3 is a sectional view taken along line III—III of FIG. 2.

According to the present invention, the process for producing an integral skin polyurethane foam comprises expanding a reacting mixture containing substantially no blowing agent in an evacuated mold cavity.

The phrase "containing substantially no blowing agent" means that the reacting mixture is not deliberately incorporated with any blowing agent (including freon, methylene chloride, water, and fine bubbles) for the purpose of blowing or blowing control. In other words, the reacting mixture may contain slight amounts of various gases which are originally present therein, slight amounts of air entrapped inevitably thereby during cycling, and slight amounts of moisture absorbed inevitably thereby. The phrase also means that the reacting mixture may contain a variety of blowing agents in such small amounts that they hardly affect the blowing control.

The water content (due to the inevitable moisture absorption) in the polyol mixture should preferably be limited to 0.4 wt %. With a water content in excess of 0.4 wt %, the polyol mixture will partly remain unreacted on account of reaction between the water and part of the isocyanate. This results in a polyurethane foam poor in physical properties such as tensile strength and tear strength.

The extent to which the mold cavity is evacuated varies depending on the kind and desired expansion ratio of the polyurethane foam to be produced. For the production of steering wheels, it is desirable to evacuate the mold cavity to 50 Torr or below in order to form a skin which should have a soft feel as well as a firm feel.

It is desirable to control the reaction rate of the reacting mixture such that the reacting mixture reaching the vent hole cures to seal the vent hole. A lower reaction rate will result in a large amount of the reacting mixture blowing off from the vent hole. A higher reaction rate will cause molding defects such as short shot, pinholes, and voids.

Once injected into the mold cavity, the reacting mixture rapidly expands and flows under reduced pressure irrespective of the progress of the urethane-forming reaction. This causes the reacting mixture to reach the vent in a much shorter time than in the conventional process. For the reacting mixture to cure when it has reached the vent hole, it is necessary that the reaction rate of the reacting mixture be much higher than in the conventional process. A means to increase the reaction rate is by increasing the amount of the catalyst or by increasing the temperature of the reacting mixture. (The latter means is possible because no freon is used in the present invention.)

The method of the present invention is suitable for producing a polyurethane foam around a core metal previously placed in the mold cavity. It is most suitable for the production of steering wheels, with an integral skin polyurethane form covering a core metal (at least the ring part thereof),placed in the mold cavity.

According to the present invention, the apparatus for producing an integral skin polyurethane foam comprises a mold having a cavity and a vent hole, a vacuum chamber communicating with the cavity through the vent, a vacuum pump to evacuate the cavity through the vacuum chamber, and a sight glass attached to the vacuum chamber so as to make the vicinity of the vent hole visible from the outside of the vacuum chamber. The vacuum chamber may be a space of an evacuated box surrounding the mold cavity or a space which is formed, when the mold is closed, by the Groove in the periphery of the mold cavity.

To produce an integral skin polyurethane foam according to the method of the present invention, the reacting mixture is injected into the evacuated mold cavity. Although the reacting mixture contains substantially no blowing agent, it contains slight amounts of gases originally present therein and absorbed inevitably by it during its cycling. Under reduced pressure, these gases rapidly vaporize, causing the reacting mixture to expand rapidly in a very short time. As the result, the reacting mixture flows in the cavity and fills the cavity. Simultaneously with the expansion, the reacting mixture undergoes the exothermic urethane-forming reaction which brings about curing.

At this time, the reacting mixture at the center of the mold cavity becomes viscous rapidly due to curing and hence holds the gas bubbles as they appear. This is the mechanism to form the highly expanded core.

The reacting mixture in contact with the inner surface of the mold cavity permits heat to dissipate through the walls of the mold cavity. This heat dissipation makes the urethane-forming reaction slow relative to that at the center and hence prevents the reacting mixture from becoming viscous. The gas bubbles near the inner surface of the mold cavity rupture easily under reduced pressure, and the released gas is removed. Thus there is formed a non-porous solid skin containing even very few minute bubbles.

The evacuated cavity helps avoid such defects as pinholes, voids, and short shot. Unlike the conventional foaming by freon, this obviates the necessity of overpacking the reacting mixture to form the skin and to ensure the complete filling and air escape, which leads to the reduction of material loss. In this way, it is possible to produce a superior polyurethane foam composed of a highly expanded core and a solid skin.

The foaming due to the expansion of the gases absorbed by the reacting mixture is not by the vaporization of a gas, unlike the foaming by freon; therefore, it does not take away the reaction heat of the reacting mixture after injection. This permits the temperature rise of the reacting mixture and hence reduces the cure time.

In practicing the above-mentioned method, the water content in the polyol mixture is limited to 0.4 wt %, so as to reduce the amount of the isocyanate to be consumed by water and hence to reduce the amount of the polyol mixture which will otherwise remain unreacted. This contributes to the improved physical properties (such as tensile strength and tear strength) of the resulting polyurethane foam.

According to the present invention, the mold cavity should preferably be evacuated 50 Torr or below, so as to help the gas bubbles to rupture in the reacting mixture in contact with the inner surface of the mold cavity. This makes the skin thick and eliminates the minute gas bubbles which will otherwise remain in the skin.

According to the present invention, the reacting mixture is so formulated as to establish a proper reaction rate such that it cures to seal the vent as soon as it reaches the vent. Thus it is possible to achieve a reaction rate higher than that of the freon-containing reacting mixture. This contributes to improvement in production efficiency.

Evacuating the mold cavity offers another advantage in the case where a core metal is placed in the mold cavity. Even though the reacting mixture is subject to turbulence by the core metal, the turbulence under reduced pressure is less liable to cause defects such as pinholes, voids, and short shot. This permits one to select an adequate place for gating more freely and to reduce the number of vents.

The combination of an evacuated mold cavity and a core placed therein offers an advantage that an almost non-porous solid adhesive layer is formed on the core, because the core functions as a heat sink such that it absorbs reaction heat from the reacting mixture in contact with it, thereby stopping the reacting mixture from becoming viscous, and the less viscous reacting mixture releases gas from gas bubbles under reduced pressure.

The foregoing holds true especially when the core is that of a steering wheel and at least the ring of the core is placed in the mold cavity. In this case, only one gate on the outer periphery of the ring will suffice and the number of vents may be limited to one. Thus the method of the present invention will prevent defects (such as weld line, pinholes, voids, and short shot) from occurring at the point where the flows of the reacting mixture meet one another.

The apparatus of the present invention for producing an integral skin polyurethane foam has a vacuum chamber communicating with the mold cavity through the vent. This vacuum chamber functions as an accumulator. In the case where the mold cavity is to be evacuated before the injection of the reacting mixture, the vacuum chamber prevents the pressure in the mold cavity from increasing as the reacting mixture expands after injection. Alternatively, it is possible to rapidly evacuate the mold cavity into which the reacting mixture has been injected if the mold cavity is connected to the vacuum chamber after injection.

The apparatus of the present invention has a sight glass which makes the vicinity of the vent hole visible from the outside of the vacuum chamber. Thus the sight glass permits one to confirm the blowing off of the reacting mixture from the vent hole and to observe the reacting mixture expand, with the vacuum chamber kept closed.

EXAMPLE 1

An embodiment of the present invention in the production of a steering wheel pad will be described with reference to FIGS. 1 to 5. This example employs an apparatus which is made up of (a) a split mold 1, (b) a vacuum chamber 11 arranged in the mold 1, (c) a vacuum pump 20 to evacuate the vacuum chamber 11, and (d) an injecting mechanism 21 which is attached to the vacuum chamber 11 and is intended to inject the reacting mixture into the cavity 4 of the mold 1. A detailed description of each component is given below.

The mold 1 is made up of a stationary half 2 and a movable half 3, which form a cavity 4 when closed. In the PL (parting line) surface 2a of the stationary half 2 and the PL surface 3a of the movable half 3, the split molds have grooves which form a sprue 6, runner 7, and gate 8 through which the reacting material is injected into the cavity 4. When the mold is closed, there will be a clearance of about 0.03-0.06 mm (due to the limit of machining precision) between the PL surfaces 2a and 3a over the entire periphery of the cavity 4. This clearance functions as an air vent land for venting (mentioned later). A vent hole 5 is formed at that position L of the stationary half 2 where the filling of the cavity with the reacting mixture completes.

The vent hole 5 is usually 1-10 mm in diameter. With a diameter smaller than 1 mm, the vent hole 5 does not perform venting as desired, with the final filling position of the reacting mixture fluctuating. With a diameter larger than 10 mm, the vent hole 5 leaves a noticeable vent mark which makes the molded article look poor. The vent hole 5 in this example is a straight one, 15 mm long and 3 mm in diameter. The mold 1 may be made of aluminum or electroformed for economy, because it merely needs to withstand a foaming pressure, which is usually 50-500 kPa.

Figure 5:
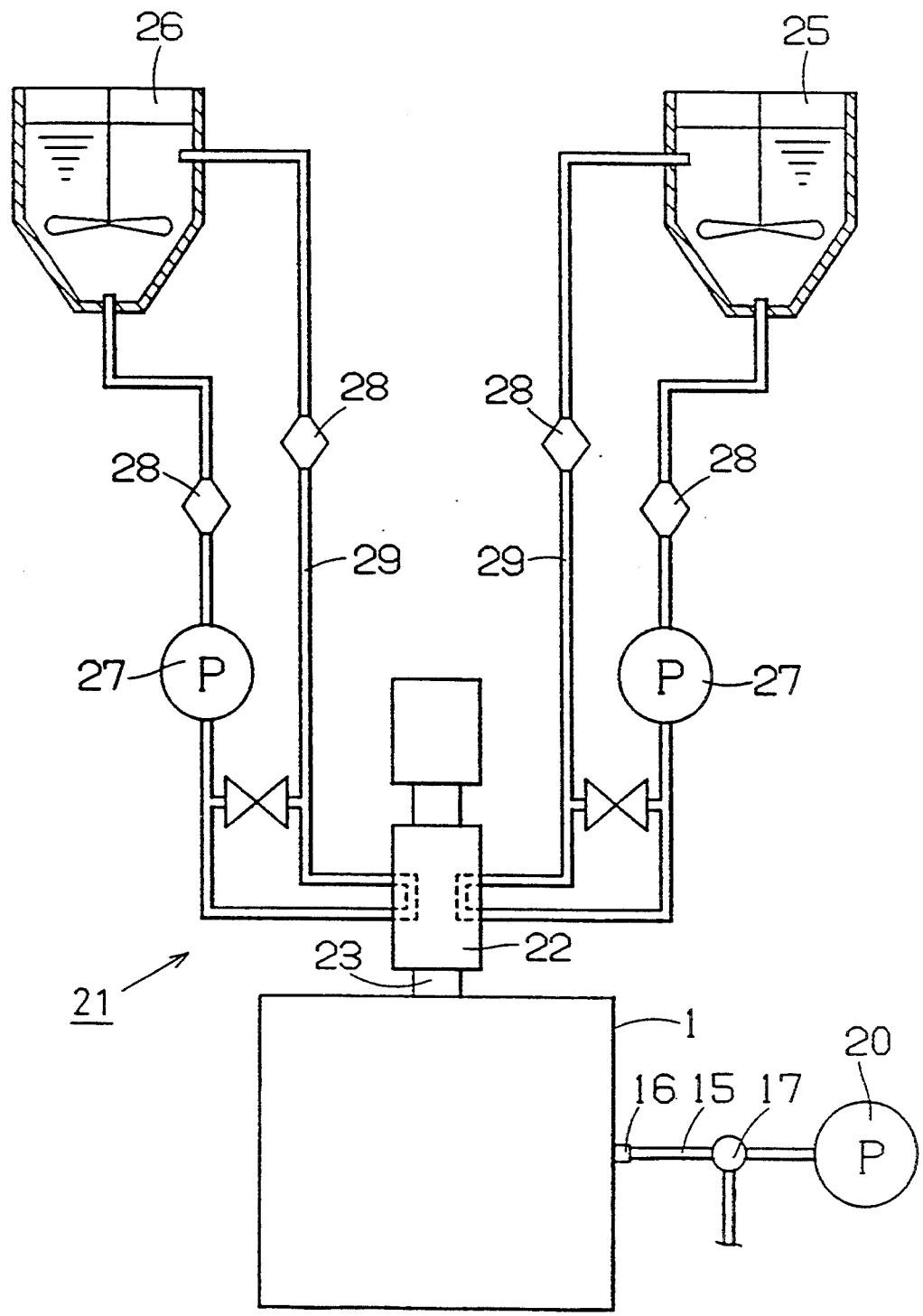
FIG. 5 is a schematic diagram showing the mixing unit for the reacting mixture.

The vacuum chamber 11 is made up of an upper casing 12 to which the stationary half 2 is fixed and a lower casing 13 to which the movable half 3 is fixed. The mating surface of the lower casing 13 is provided with a sealing O-ring 14, which makes the closed vacuum chamber 11 airtight. The lower casing 13 is also provided with a suction port 16, which is connected to a vacuum pump 20 through a suction hose 15 and a leak valve 17, as shown in FIG. 5. The vacuum chamber 11 in this example is constructed such that it accommodates the mold 1, forming a space K therein.

The injection mechanism 21, as shown in FIG. 5., is made up of a storage tank 25 for the polyol mixture, a storage tank 26 for the isocyanate, a mixing head 22, and two circuits 29, each connecting the storage tank and the head through a high-pressure pump 27 and filters 28. This construction permits the mixing and circulation of the polyol mixture and isocyanate. The mixing head 22 is provided with an injection nozzle 23 which can be connected to the sprue 6 of the mold 1 through O-rings 24.

The reacting mixture used in this example is composed of the above-mentioned polyol mixture and isocyanate. The reacting mixture contains substantially no blowing agent deliberately added, with the water contain in the polyol mixture limited to no more than 0.4 wt %. The temperature of the reacting mixture is higher than that of the conventional freon-containing reacting mixture. To be more specific, the polyol mixture is kept at about 40°-50° C. and the isocyanate is kept at about 25°-30° C. in this example, whereas the polyol mixture and isocyanate are both kept at about 25°-30° C. in the conventional freon-based foaming. There are two reasons for this. (1) The freon-free reacting mixture in this example is more viscous than the conventional freon-containing one; this disadvantage is eliminated by raising the temperature. (2) It is necessary to increase the reaction rate of the reacting mixture by raising the temperature.

The sequence of operation in this example is described below.

(1) First, the vacuum chamber 11 is closed airtight before or after the mold 1 is closed to form the cavity 4 by mating the stationary half 2 and the movable half 3 with each other. In the former case, the mold 1 should be closed completely after the closing of the vacuum chamber 11. To close the vacuum chamber 11 airtight, the lower casing 13 is raised by a hydraulic cylinder ram (not shown) until it comes into contact with the upper casing 12. The airtight closing is achieved by the seal 14 held between the upper casing 12 and the lower casing 13. Incidentally, it is possible to close and open the mold 1 and the vacuum chamber 11 independently using separate hydraulic cylinders. It is desirable to devise a mechanical linkage which permits a single hydraulic cylinder to close the mold 1 and the vacuum chamber almost simultaneously. This saves the cost of equipment.

(2) Then, the vacuum pump 20 is put in operation so as to evacuate the space K in the vacuum chamber 11 to a prescribed atmosphere, which is usually 50 Torr or below, through the suction port 16. During this step, the cavity 4 of the mold 1 is in communication with the space K in the vacuum chamber 11 through the sprue 6, the clearance between the PL surfaces 2a and 3a, and the vent hole 5. Therefore, the cavity 4 is also evacuated to almost the same prescribed atmosphere as in the space K.

Figure 4:
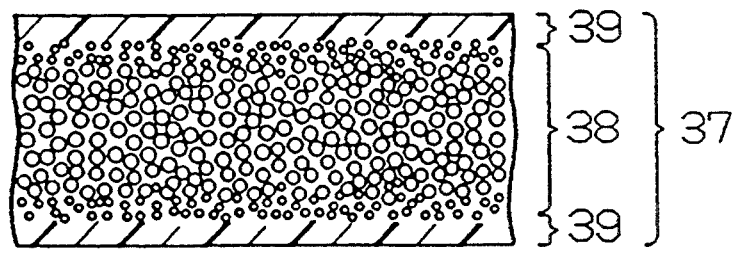
FIG. 4 is a partly enlarged sectional view showing a steering wheel pad produced by the apparatus shown in FIG. 1.

(3) With the evacuation continued, the reacting mixture M (for RIM) is injected into the cavity 4 of the closed mold 1 through the injection nozzle 23 of the mixing head 22. At the center of the cavity, the injected reacting mixture M forms a highly expanded core 38 (as shown in FIG. 4) owing to the expansion of the absorbed gas under reduced pressure. On the inner surface of the cavity, the injected reacting mixture M forms a non-porous solid skin 39 (as shown in FIG. 4) by the mechanism mentioned above.

Since the temperature of the reacting mixture M is set high as mentioned above, the reaction rate of the reacting mixture M is high enough to cure and seal the vent hole 5 when it reaches the vent hole 5 and blows off from the vent hole 5. In addition, the foaming takes place without taking away the reaction heat of the injected reacting mixture M, with the result that the temperature of the reacting mixture M increases further. This results in a reduced cure time.

An additional effect of evacuating the cavity 4 is that the reacting mixture M completely fills undercuts and branches in the cavity 4 if there are any and the reacting mixture M easily releases gases which are discharged through the vent hole 5 and the clearance between the PL surfaces 2a and 3a. This obviates the need of overpacking the reacting mixture, unlike the conventional freon-based foaming, and hence saves the reacting mixture.

(4) Finally, the molding operation is completed by opening the mold 1 and the vacuum chamber 11 and demolding the steering wheel pad 37. The thus produced steering wheel pad 37 has a better appearance than that produced by the conventional freon-based foaming, because the skin 39 has no minute bubbles in its surface. In addition, the steering wheel pad 37 has good physical properties (such as tensile strength and tear strength) because the water content in the reacting mixture M is limited to less than 0.4 wt %.

EXAMPLE 2

Another embodiment of the present invention in the production of a steering wheel ring and spokes will be described with reference to FIGS. 6 to 15. The molding apparatus has many parts common to that in the first example. Basically, it is constructed of a mold 1, a vacuum chamber 11, vacuum pump 20, and a injecting mechanism 21. Those parts common to that in the first example are indicated by like reference numbers in FIGS. 6 to 11, and their description is not repeated except for the supplementary description that follows.

The core 42 of the steering wheel 41 is composed of a boss, a ring, and spokes connecting the boss and ring. The mold 1 is intended to form the covering 43 around the ring and spokes of the core 42. The mold 1 is composed of an upper stationary half 2 and a lower movable half 3. They have grooves 4a, which form a circular cavity 4 when they are closed. At the center of the cross-section of the cavity 4 is placed the core 42 (including the entire ring and a part of the spoke). A gate 8 opens on the outer periphery of the groove 4a (the left side in FIG. 6). Upon injection into the cavity 4 through the gate 8, the reacting mixture M flows in two directions in the cavity 4 and the two flows meet at position L (at the right side in FIG. 6) where the filling of the cavity is completed. At position L in the stationary half 2 is formed a vent hole 5 through which the cavity 4 communicates with the space in the vacuum chamber 11.

Inside the grooves 4a of the stationary half 2 and movable half 3 are mating parts 31 to align the two halves and a recess 32 and pedestal 33 to hold in position the boss of the core 42. The pedestal 33 is provided with an ejector pin 34 to demold the finished steering wheel 41. As in Example 1, a clearance of 0.03–0.06 mm is formed between the PL surfaces 2a and 3a when the mold is closed.

Figure 9:
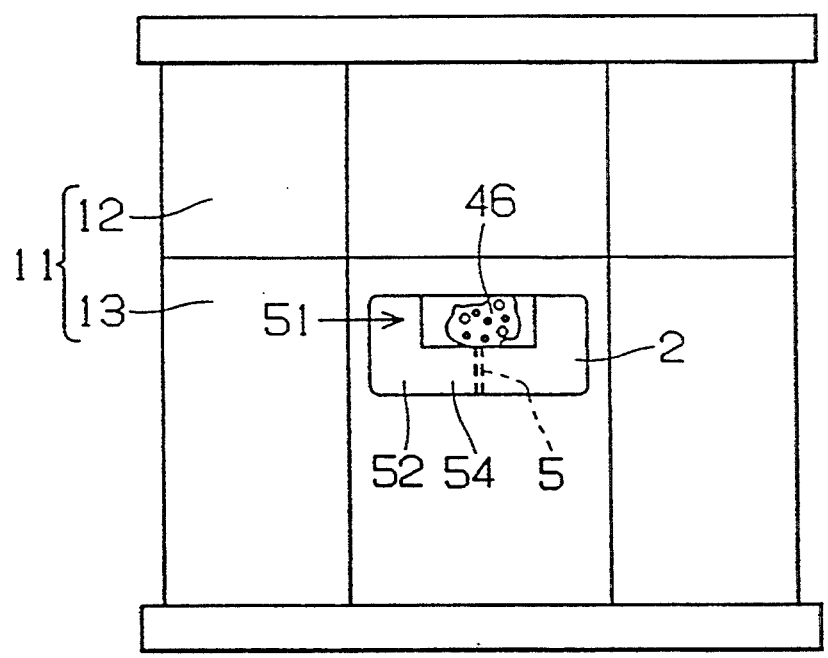
FIG. 9 is a side view showing RIM operation under way, with the mold closed, in the apparatus as shown in FIG. 6.
Figure 10:
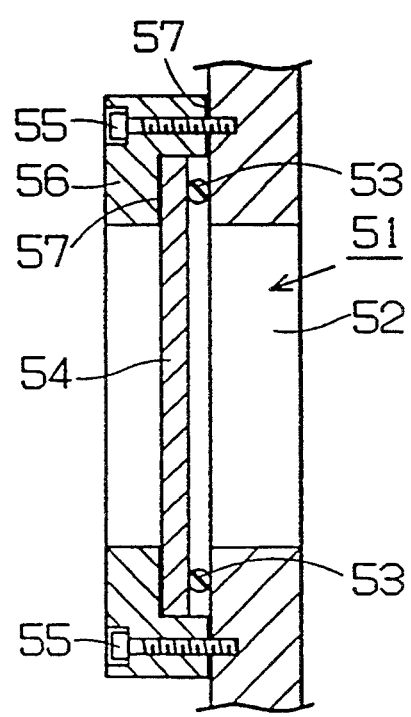
FIG. 10 is a sectional view of the sight glass in the apparatus as shown in FIG. 6.
Figure 11:
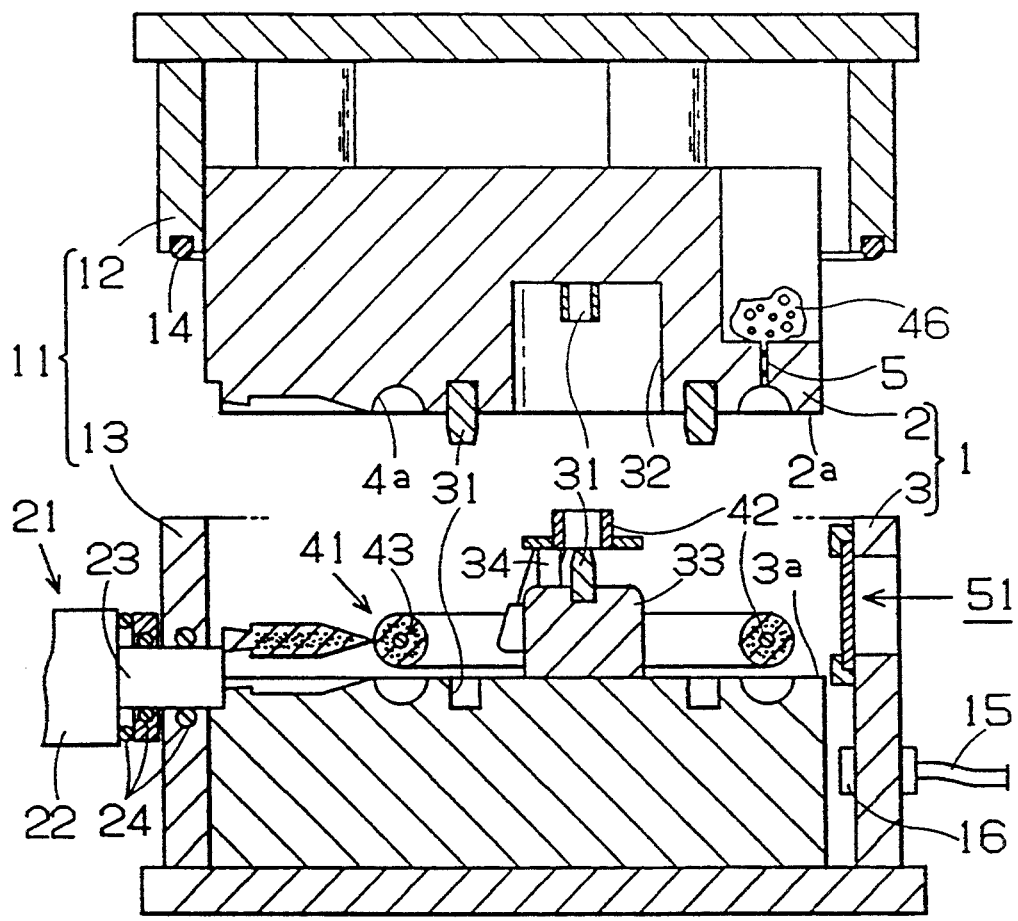
FIG. 11 is a sectional view of the apparatus as shown in FIG. 6, with the mold opened for the demolding of the steering wheel.

The lower casing 13 of the vacuum chamber 11 is provided with a sight glass 51 which makes the vicinity of the vent hole 5 visible from the outside of the vacuum chamber 11, as shown in FIGS. 9 and 10. The sight glass 51 is made up of an opening 52 formed in the lower casing 13, a transparent plate 54 of glass or plastics which is pressed against the inside of the lower casing 13, with a seal ring 53 placed between them, so as to close the opening 52 from the inside, and a frame 56 which is fastened to the lower casing 13 by bolts 55 such that it presses the periphery of the transparent plate 54. It is desirable to place a gasket 57 between the frame 56 and the transparent plate 54 and between the frame 54 and the lower casing 13.

The stationary half 2 and the upper casing 12 are integrally constructed, and the movable half 3 and the lower casing 13 are also integrally constructed. The lower casing 13 is connected to a hydraulic cylinder ram (not shown), so that it is raised and lowered as the mold is closed and opened. At the time of mold closing, the lower casing 13 is raised until its periphery comes into contact with the periphery of the upper casing 12.

As in Example 1, the reacting mixture used in this example is composed of a polyol mixture and an isocyanate. It contains substantially no blowing agent deliberately added, and the water content in the polyol mixture is limited to less than 0.4 wt %. The temperature of the reacting mixture is set higher than that of the conventional freon-containing reacting mixture.

The sequence of operation in this example is described below.

Figure 6:
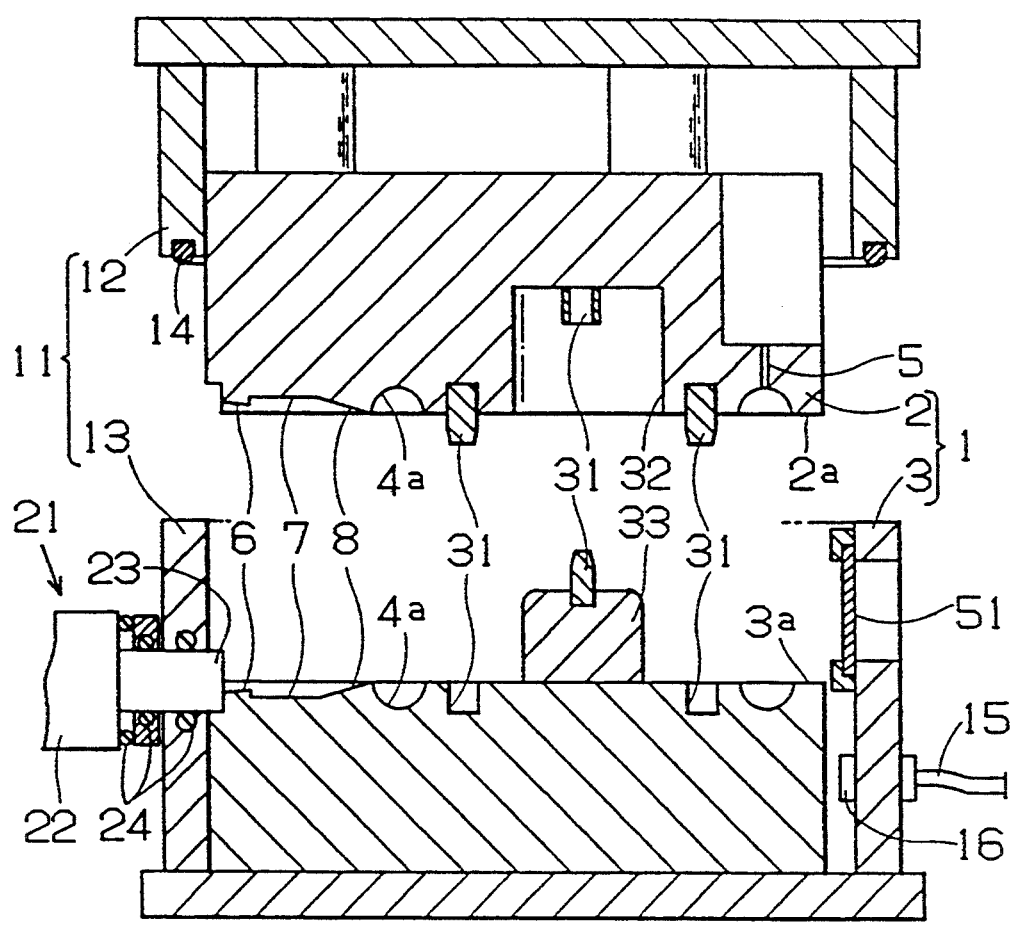
FIG. 6 is a sectional view showing the vacuum chamber and mold (in the open position) used in the second example of the present invention.
Figure 7:
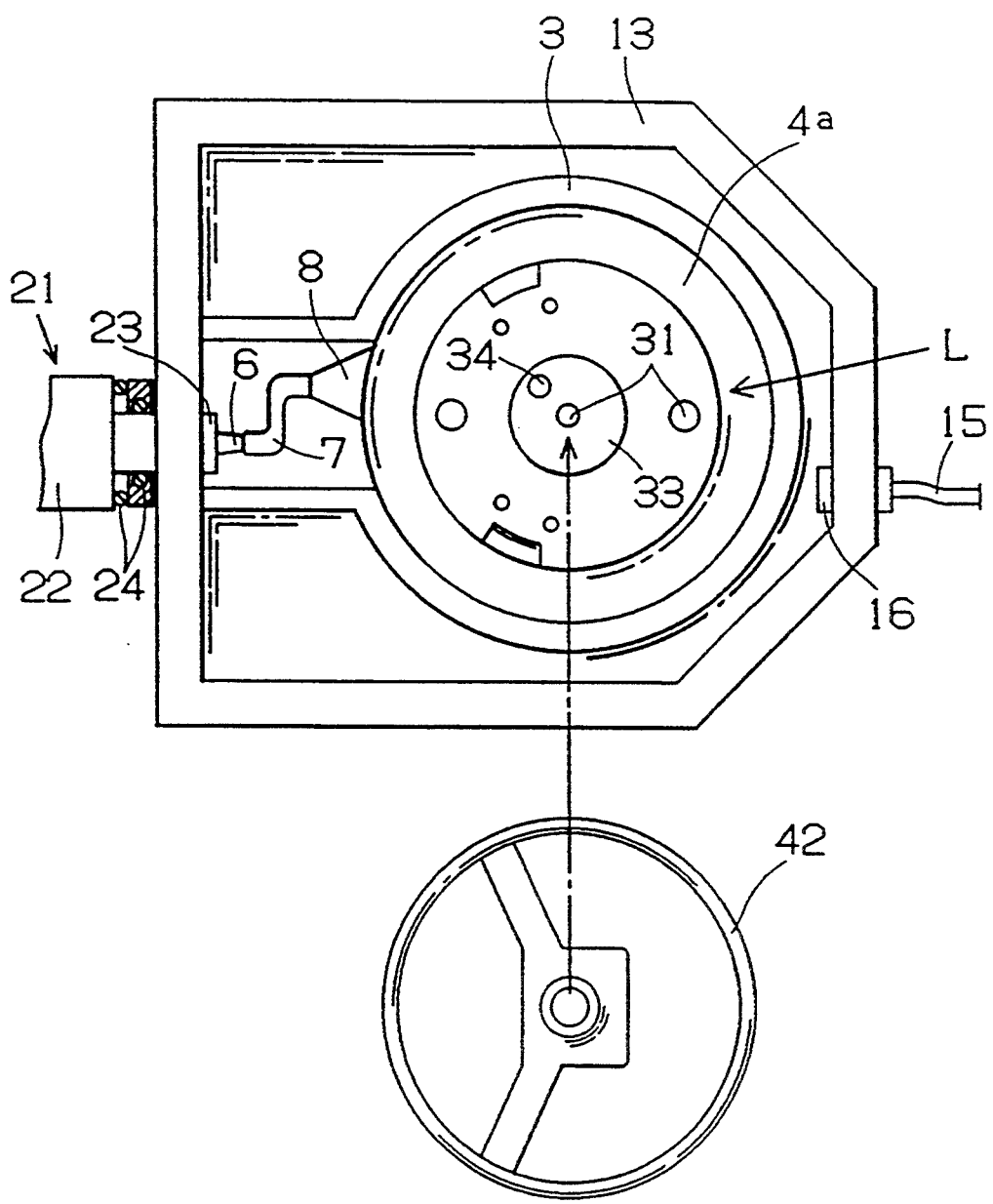
FIG. 7 is a plan view showing the lower casing of the vacuum chamber and the movable half of the mold (in the open position) in the apparatus as shown in FIG. 6.

(1) First, with the stationary half 2 and movable half 3 of the mold 1 open as shown in FIGS. 6 and 7, the core 42 is set in the movable half 3 as shown in FIG. 7.

(2) The stationary half 2 and movable half 3 of the mold 1 are closed completely to form the cavity 4. Simultaneously, the lower casing 13 is raised until the periphery of thereof comes into contact with the periphery of the upper casing 12, so as to close the vacuum chamber 11 airtight.

(3) Then, the vacuum pump 20 is put in operation so as to evacuate the space K in the vacuum chamber 11 to a prescribed atmosphere, which is usually 50 Torr or below, through the suction port 16. During this step, the cavity 4 of the mold 1 is also evacuated through the vent hole 5 and the clearance between the PL surfaces 2a and 3a to almost the same prescribed atmosphere as in the space K.

Figure 8:
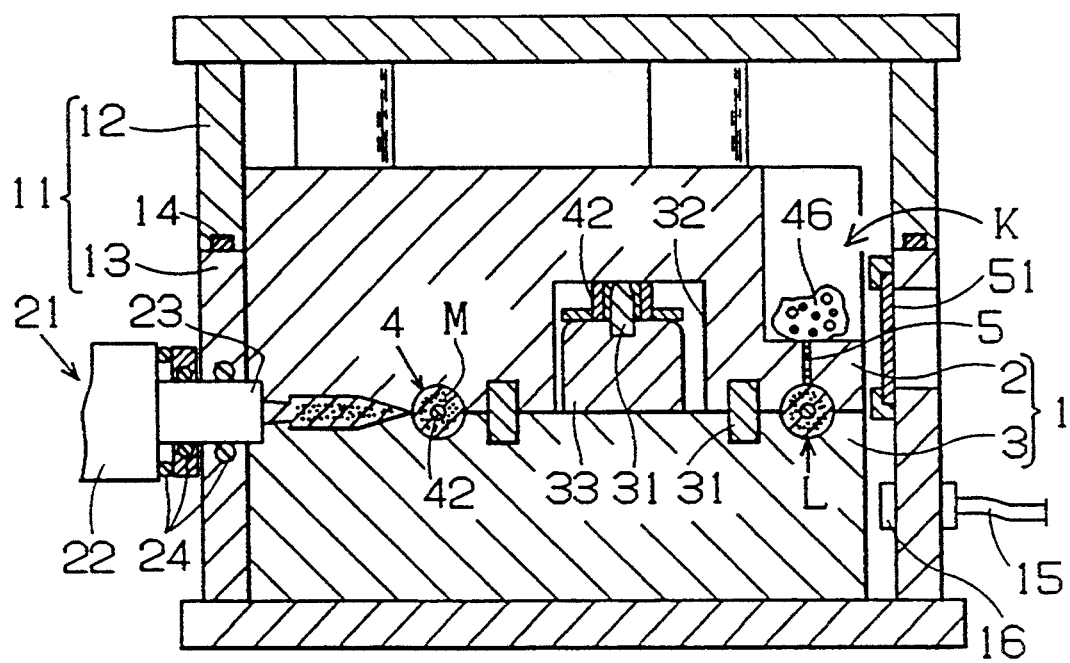
FIG. 8 is a sectional view showing RIM operation under way, with the mold closed, in the apparatus as shown in FIG. 6.

(4) With the evacuation continued, the reacting mixture M (for RIM) is injected into the cavity 4 of the closed mold 1 through the injection nozzle 23 of the mixing head 22, as shown in FIG. 8. The volume of injection is usually ¼ to ¾ of the volume of the cavity 4. The injection time is 2–4 seconds.

Figure 12:
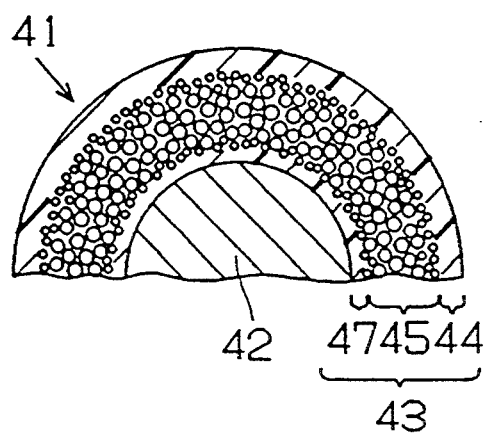
FIG. 12 is a partly enlarged sectional view of the steering wheel as shown in FIG. 11.

At the center of the cavity and the core 42, the injected reacting mixture M forms a highly expanded core 45 (as shown in FIG. 12) owing to the expansion of the absorbed gas under reduced pressure. On the inner surface of the cavity, the injected reacting mixture M forms a non-porous solid skin 44 (as shown in FIG. 12) by the mechanism mentioned above. Also, on the surface of the core 42, the injected reacting mixture M forms a non-porous solid adhesive layer 47 (as shown in FIG. 12) by the mechanism mentioned above. Usually, the adhesive layer 47 is slightly thinner than the skin 44.

The injected reacting mixture M usually takes 1-2 seconds to fill the cavity. As the reacting mixture flows in the cavity, it seals the clearance between the PL surfaces 2a and 3a. The reaction rate of the reacting mixture M is controlled such that as soon as the forward end of the flowing reacting mixture M reaches the vent hole 5 and slightly blows off from the vent hole 5, it cures to seal the vent hole 5. In addition, the foaming takes place without taking away the reaction heat of the injected reacting mixture M, with the result that the temperature of the reacting mixture M increases further. This results in a reduced cure time.

According to this example, one can observe what is happening in the vicinity of the vent hole 5 through the sight glass 51 from the outside of the vacuum chamber 11. In other words, one can see the reacting mixture M blowing off from the vent hole 5 or foaming, while keeping the vacuum chamber 11 closed.

(5) When the reacting mixture has cured in the cavity, the mold 1 is opened (or the movable half 3 is separated from the stationary half 2) and simultaneously the vacuum chamber 11 is opened. The cure time is usually 50-80 seconds. (The freon-containing reacting mixture takes 80-100 seconds to cure.) The mold opening action is interlocked with the ejector pin 34 which automatically demolds the finished steering wheel 41. Finally, the molding operation is completed by removing the discharged part 46 of the reacting mixture M.

In the meantime, the molding of the covering 43 of the steering wheel 41 used to present the following two problems characteristic of the steering wheel in addition to the above-mentioned problems associated with freon. However, they are solved in the present invention. It follows therefore that the method of this example is suitable for molding the covering of the steering wheel.

(a) The reacting mixture M is subject to turbulence owing to the long ring of the core 42, and turbulence causes defects such as pinholes, voids, and short shot. In this example, however, the reacting mixture M is less liable to turbulence because the cavity 4 is evacuated. This permits one to select the position of the gate 8 more freely. In this example, the gate 8 is on the outer periphery of the ring and there is only one vent hole 5.

(b) The injected reacting mixture M flows in two directions and the two flows meet at the final fill position L, as mentioned above. The flow in this manner used to cause a weld line at the meeting point and to entrap gases which lead to defects such as pinholes, voids, and short shot. In this example, however, this problem is solved because the cavity is evacuated and the reacting mixture at the meeting point blows off from the vent hole 5.

Another advantage in this example is that the covering 43 firmly adheres to the ring of the core 42 owing to the solid adhesive layer 47.

In the second example, the water content in the polyol mixture is limited to less than 0.4 wt %, as mentioned above. In order to see how the water content affects the physical properties of the resulting polyurethane foam, the following experiment was carried out. Three reacting mixtures containing no freon were prepared according to the formulation shown in Table 1, with the water content in the polyol mixture limited to 0.13 wt %, 0.35 wt %, and 0.54 wt %. Each of the reacting mixtures was made into the covering of the steering wheel under the molding conditions shown in Table 2. The covering was tested for physical properties. For the purpose of comparison, a reacting mixture containing freon was prepared according to the formulation shown in Table 1, with the water content in the polyol mixture limited to 0.22 wt %. The reacting mixture was made into the covering of the steering wheel under the conventional molding conditions shown in Table 2. The covering was tested for physical properties.

TABLE 1

| Formulation of reacting mixture | | |
|---|---|---|
| Components | Example 2 (parts by weight) | Conventonal (parts by weight) |
| Polyol mixture | | |
| Polyether polyol (ave. M.W. = 5000) containing equal amounts of difunctional polyol (ave. M.W. = 4000) and trifunctional polyol (ave. M.W. = 6000) | 100 | 100 |
| Diethylene glycol (M.W. = 106) | 18 | 18 |
| 33% solution of triethylenediamine in dipropylene glycol | 2 | 2 |
| Pigment | 6 | 6 |
| Antioxidant | 1 | 1 |
| Freon-11 | none | 16 |
| Isocyanate | | |
| MDI prepolymer | 65 | 65 |

TABLE 2

| | Molding conditions | |
|---|---|---|
| Items | Example 2 | Conventional |
| Temperature of polyol mixture | 45° C. | 28° C. |
| Temperature of isocyanate | 28° C. | 28° C. |
| Injection speed of reacting mixture | 140 g/s | 145 g/s |
| Injection time of reacting mixture | 3.5 s | 4.0 s |
| Mold temperature | 55° C. | 55° C. |
| Pressure in cavity | 50 Torr | Atmospheric pressure |
| Cure time | 60 s | 90 s |

Figure 13:
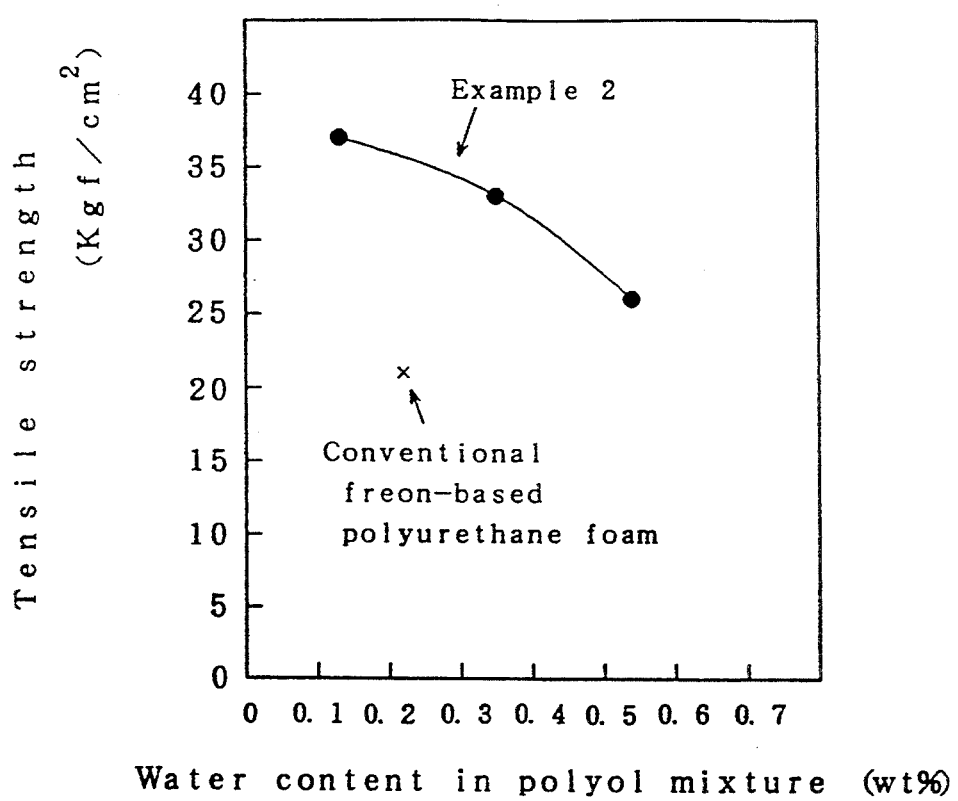
FIG. 13 is a graph showing the relationship between the tensile strength of the covering of the steering wheel and the water content in the polyol mixture.
Figure 14:
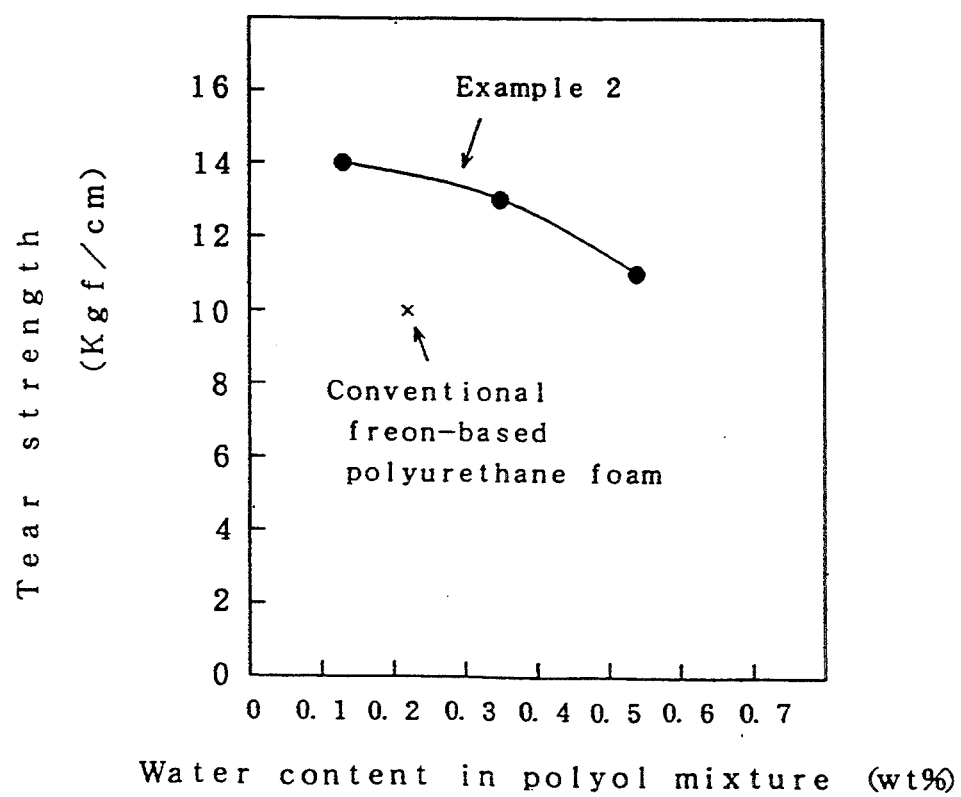
FIG. 14 is a graph showing the relationship between the tear strength of the covering of the steering wheel and the water content in the polyol mixture.

The covering of the steering wheel produced as mentioned above was tested for tensile strength and tear strength at room temperature using a test piece cut out of the highly expanded core part. The results of the test are shown in FIG. 13 (tensile strength) and FIG. 14 (tear strength). It is noted that the polyurethane foam in this example is superior in tensile strength and tear strength to the conventional freon-based one, even in the case where the water content in the polyol mixture is 0.54 wt %. It is also noted that a pronounced effect is obtained when the water content in the polyol mixture is lower than 0.4 wt %.

Figure 15:
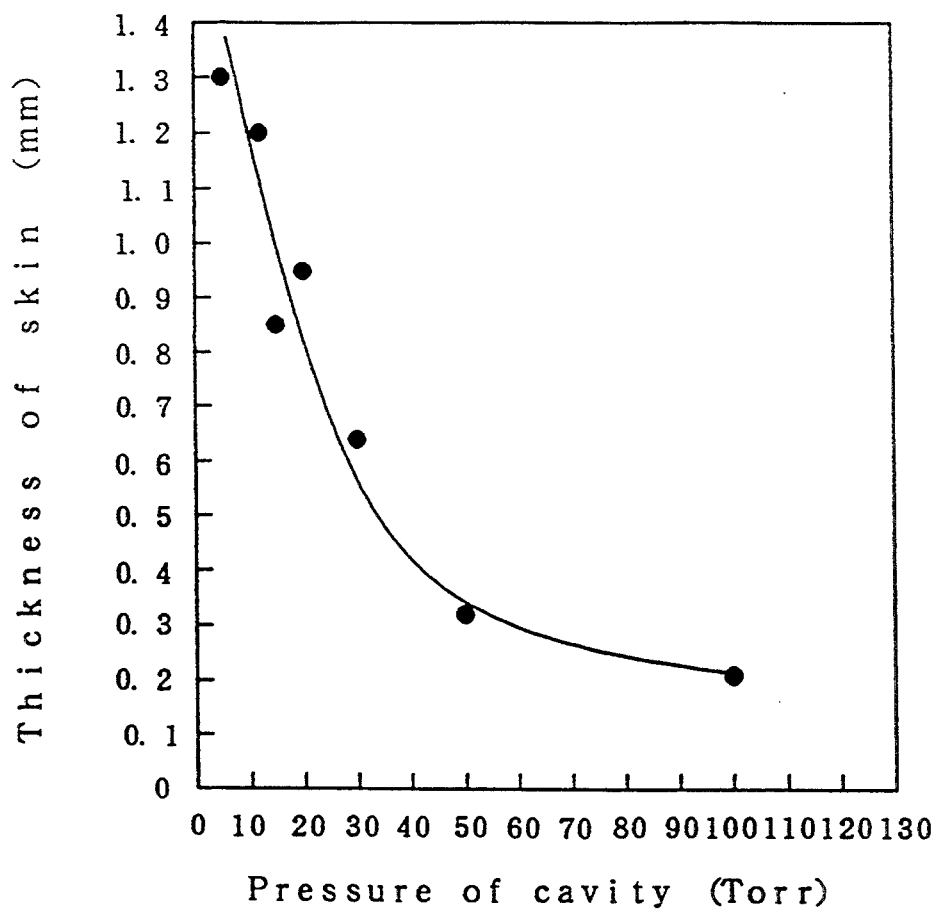
FIG. 15 is a graph showing the relationship between the thickness of the skin of the steering wheel and the pressure in the cavity.

In order to see how the pressure in the cavity affects the thickness of the skin in Example 2, a reacting mixture containing no freon was prepared according to the formulation shown in Table 1, with the water content in the polyol mixture limited to 0.35 wt %, and the reacting mixture was made into the covering of the steering wheel under the molding conditions shown in Table 2, with the pressure in the cavity adjusted to 5, 12, 15, 20, 30, 50, and 100 Torr. The covering was tested for the thickness of the skin. The results are shown in FIG. 15. It is noted that the thickness of the skin steeply increases when the pressure in the cavity is 50 Torr or below.

Figure 24:
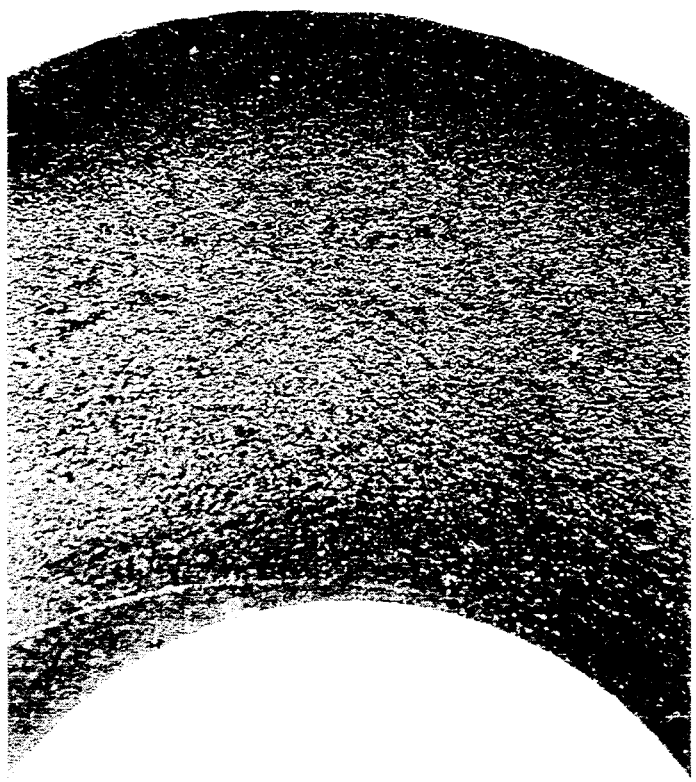
FIG. 24 is a sectional photomicrograph showing the covering of the steering wheel produced in the conventional freon-based foaming.

The sectional photomicrographs showing the covering of the steering wheel produced in this experiment are shown in FIGS. 17 to 23. The covering of the steering wheel shown in FIGS. 17 to 23 was produced with the pressure in the cavity adjusted respectively to 5, 12, 15, 20, 30, 50, and 100 Torr. For the purpose of comparison, the sectional photomicrograph, showing the covering of the steering wheel produced in the conventional freon-based foaming under the conventional molding conditions shown in Tables 1 and 2, is shown in FIG. 24.

It is understood that various changes and modifications may be made in the invention as follows without departing from the spirit and scope thereof.

(1) Although the apparatus in Example 1 is constructed of the mold 1 and the vacuum chamber 11 which are separate from each other, the mold may be of double-wall structure, with the outer wall functioning as the vacuum chamber 11, so that the space is formed in the mold integrally with the mold.

Figure 16:
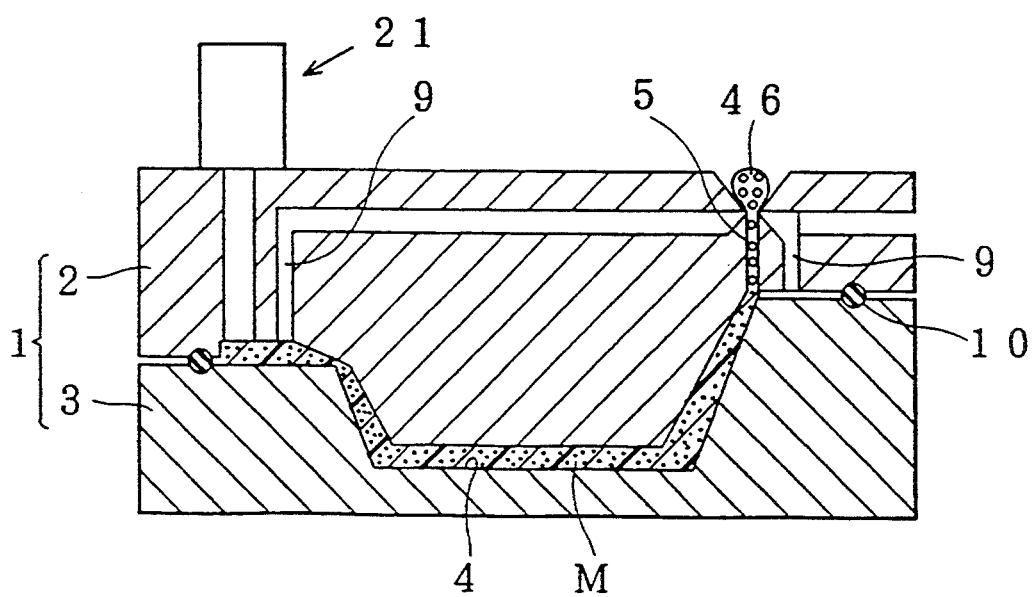
FIG. 16 is a sectional view showing another example of the mold.
Figure 17:
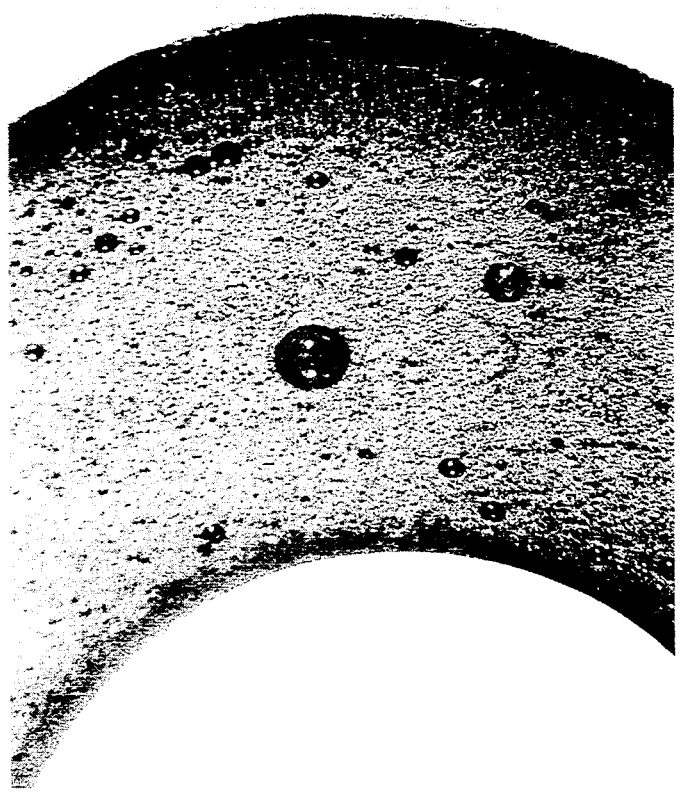
FIG. 17 is a sectional photomicrograph showing the covering of the steering wheel produced with the pressure in the cavity adjusted to 5 Torr.
Figure 18:
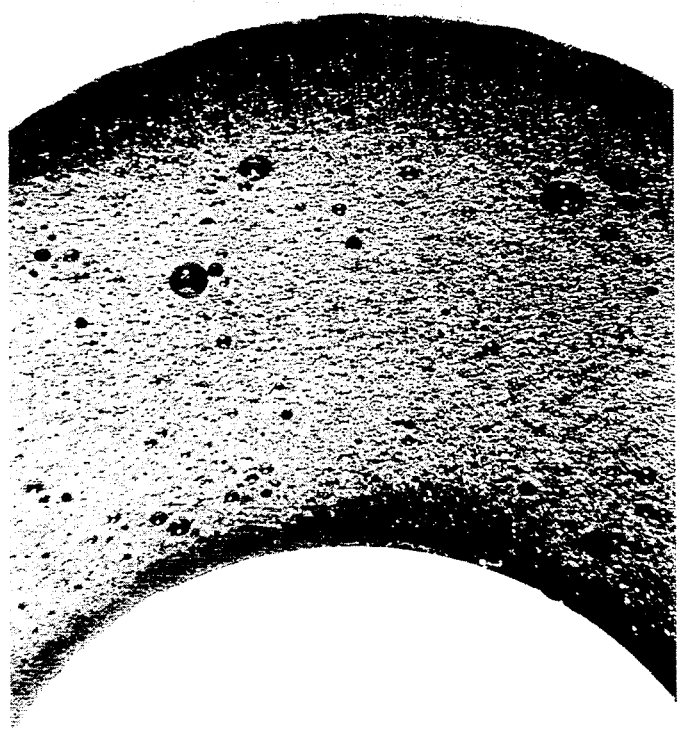
FIG. 18 is a sectional photomicrograph showing the covering of the steering wheel produced with the pressure in the cavity adjusted to 12 Torr.
Figure 19:
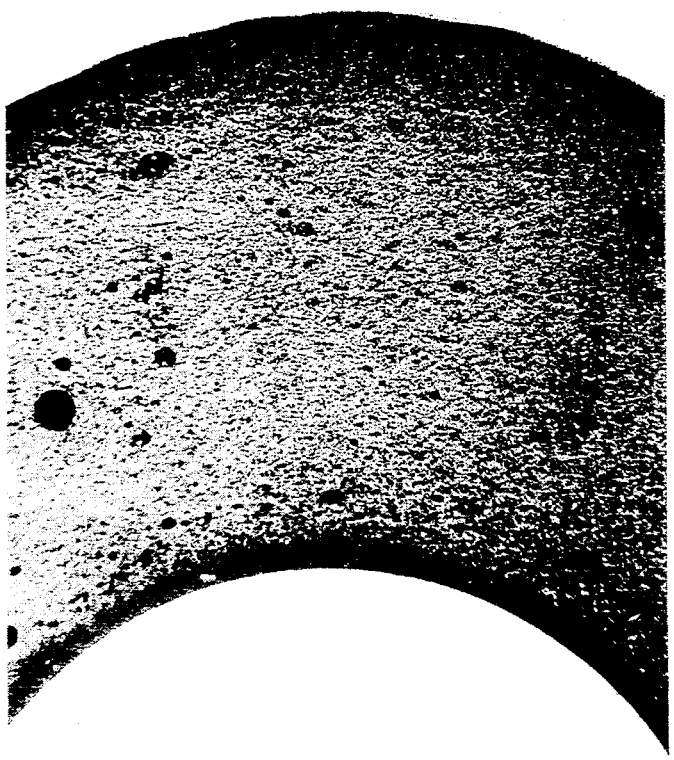
FIG. 19 is a sectional photomicrograph showing the covering of the steering wheel produced with the pressure in the cavity adjusted to 15 Torr.
Figure 20:
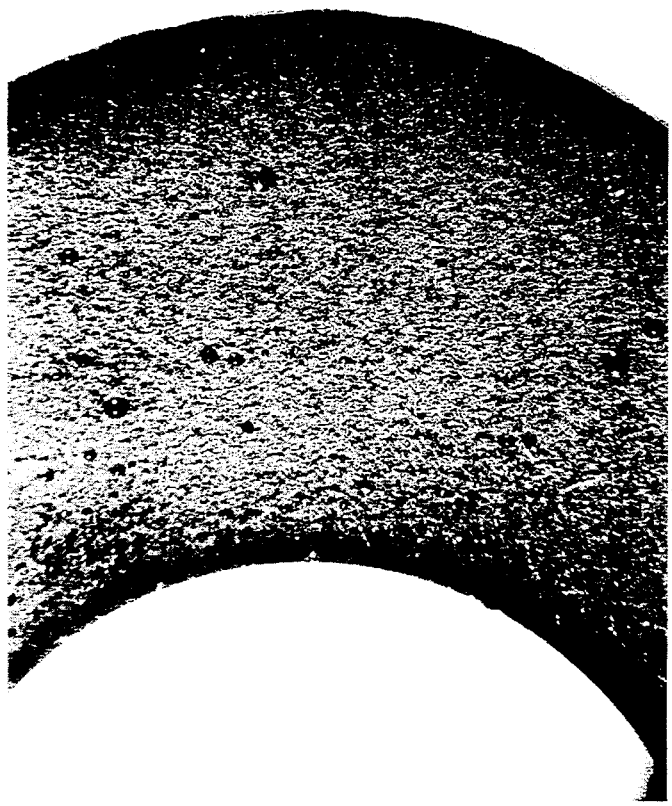
FIG. 20 is a sectional photomicrograph showing the covering of the steering wheel produced with the pressure in the cavity adjusted to 20 Torr.
Figure 21:
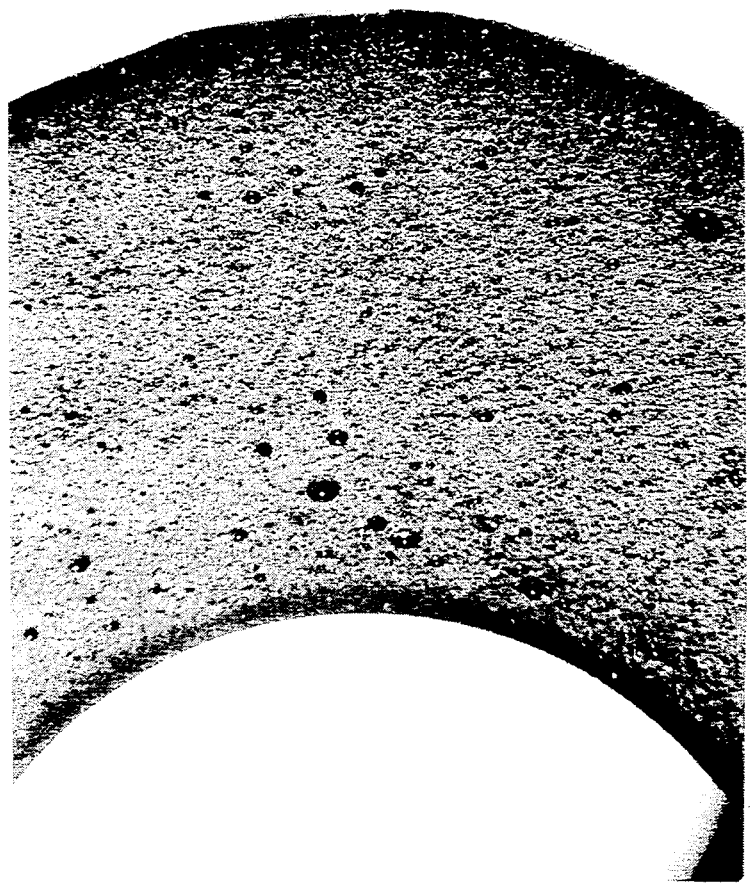
FIG. 21 is a sectional photomicrograph showing the covering of the steering wheel produced with the pressure in the cavity adjusted to 30 Torr.
Figure 22:
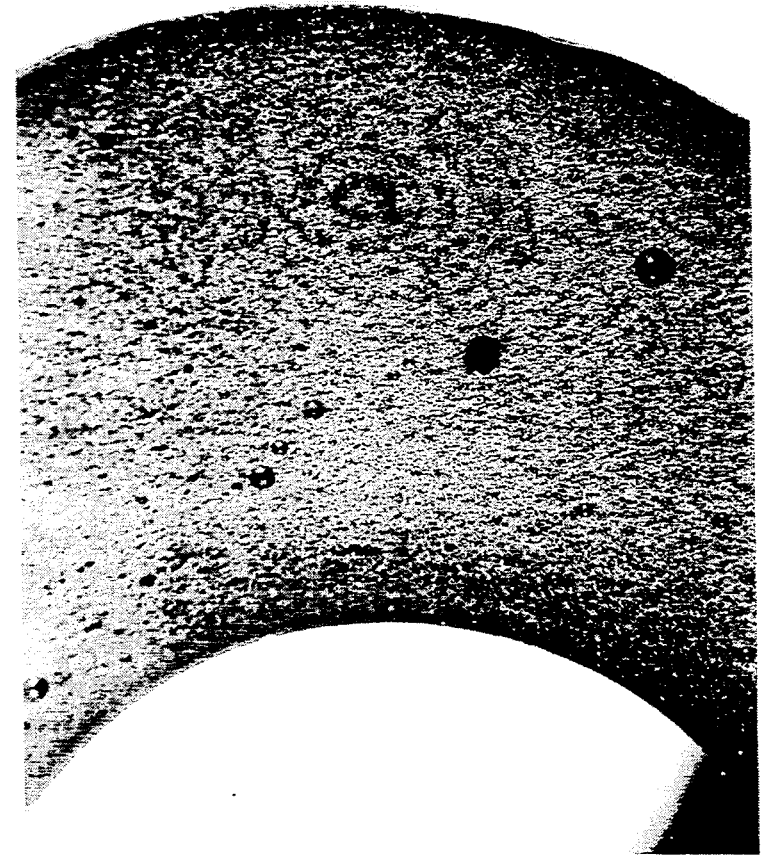
FIG. 22 is a sectional photomicrograph showing the covering of the steering wheel produced with the pressure in the cavity adjusted to 50 Torr.
Figure 23:
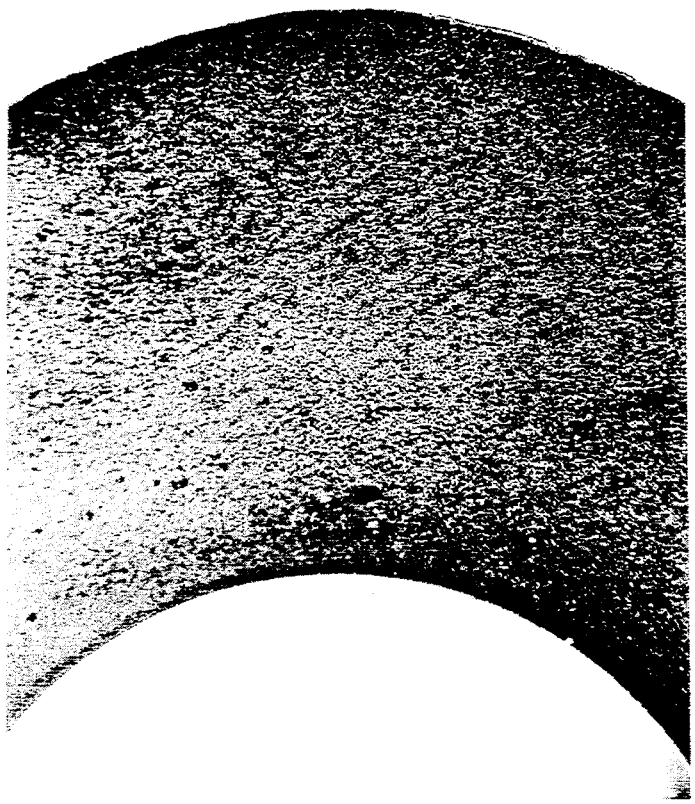
FIG. 23 is a sectional photomicrograph showing the covering of the steering wheel produced with the pressure in the cavity adjusted to 100 Torr.

(2) It may be possible to form a groove 9 in all or part of the periphery of the cavity 4 of the mold 1, as shown in FIG. 16, so that the cavity 4 is evacuated through this groove 9. In this case, the groove 9 functions as the space K. This groove 9 may be formed in either or both of the stationary half 2 and the movable half 3. It is desirable that the groove 9 be isolated from the atmosphere by a seal 10.

(3) Although the mold used in the above-mentioned examples has a vent hole 5, it is possible to replace the mold by one of another type having a porous core in place of the vent hole, said porous core facing the cavity and being positioned at a place where the injected reacting mixture reaches finally. The porous core permits the injected reacting mixture to be degassed before molding is completed.

(4) The mold is not limited to that of metal; but it may be replaced by a ceramic mold or resin mold which withstands the foaming pressure.

As many apparently widely different embodiments of this invention may be made without departing from the spirit and scope thereof, it is to be understood that the invention is not limited to the specific embodiments thereof except as defined in the appended claims.

What is claimed is:

1. A process for producing an integral skin polyurethane foam in a mold cavity which comprises:
   (1) evacuating the mold cavity to reduce the pressure thereof below atmospheric pressure;
   (2) injecting a urethane-forming reaction mixture containing a polyol mixture and substantially no blowing agent into the evacuated mold cavity; and
   (3) allowing the urethane-forming reaction mixture to react and expand within the evacuated mold cavity due to expansion of gas absorbed in said reaction mixture to form the integral skin polyurethane foam.

2. A process for producing an integral skin polyurethane foam as defined in claim 1, wherein the mold cavity is evacuated 50 Torr or below.

3. A process for producing an integral skin polyurethane foam as defined in claim 1, wherein the reacting mixture has a controlled rate of reaction such that when the injected reacting mixture reaches the vent hole of the mold, that part of the reacting mixture which is in contact with the vent hole cures to seal it.

4. A process for producing an integral skin polyurethane foam as defined in claim 1, wherein a core metal is previously placed in the mold cavity.

5. A process for producing an integral skin polyurethane foam as defined in claim 4, wherein the core metal is that of the steering wheel composed of a boss, a ring, and spokes connecting the boss and ring and at least the ring of the core metal is placed in the mold cavity.

6. The process according to claim 1 wherein said polyol mixture contains less than 0.4 wt % water.

7. The process according to claim 1 wherein said absorbed gas is of an amount which is inadvertently absorbed.

* * * * *